Figures 1, 2:
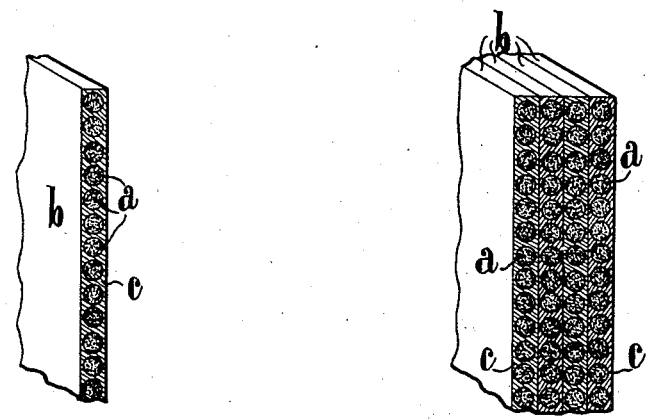

J. W. H. DEW.
FIBROUS RUBBER MATERIAL FOR USE IN THE MANUFACTURE OF WATERPROOF SHEETING, TUBING, AND THE LIKE.
APPLICATION FILED AUG. 31, 1914.

1,199,249.  Patented Sept. 26, 1916.

Inventor
J.W.H.Dew
By H.B.Wilson & Co.
Attorneys

UNITED STATES PATENT OFFICE.

JAMES WALTER HENRY DEW, OF LONDON, ENGLAND.

FIBROUS RUBBER MATERIAL FOR USE IN THE MANUFACTURE OF WATERPROOF SHEETING, TUBING, AND THE LIKE.

1,199,249. Specification of Letters Patent. Patented Sept. 26, 1916.

Application filed August 31, 1914. Serial No. 859,497.

*To all whom it may concern:*

Be it known that I, JAMES WALTER HENRY DEW, a subject of the King of Great Britain and Ireland, and residing at 8 Laurence Pountney Hill, Cannon street, in the county of London, England, have invented a certain new and useful Fibrous Rubber Material for Use in the Manufacture of Waterproof Sheeting, Tubing, and the like, of which the following is a specification.

This invention relates to fibrous rubber material of the kind composed of layers of unwrought fibers laid parallel to one another and combined and maintained in position by means of rubber or rubber-like substance.

The object of the present invention is to produce material of this nature suitable for the manufacture of waterproof sheeting, hose pipe, tubing, pneumatic tire covers and the like which shall be free from the disadvantages incident to the manufacture of such material and articles as hitherto proposed, due to insufficient impregnation of the fibers, and the invention is distinguished from the methods or processes hitherto adopted by building the article or material to be produced from any suitable number of basic strips of fiber and rubber or rubber-like substances approximately of the thickness of a single fiber, it being understood that the process of manufacture itself forms the subject of my co-pending application Serial No. 739,404 from which the present application is divided out.

In the accompanying drawing:—Figure 1 is a perspective view on an enlarged scale showing a basic or elemental strip produced in accordance with the invention. Fig. 2 is a similar view showing a series of basic or elemental strips united together to form the fibrous rubber material.

In carrying my invention into effect I take suitable unwoven fibers $a$ and after having cleaned and prepared them in any usual or desired manner I cause the fibers to be laid side by side in such a manner as to be carried in the direction of their long axes so as to produce a strip $b$ of any desired width and approximately one fiber thick, and these strips I cause to be passed through a rubber solution or solution of synthetic rubber or rubber compounds or any rubber-like substance in such a manner as to thoroughly impregnate and to entirely envelop each individual fiber in a thin covering of the rubber $c$ or rubber-like substance. These strips may be made of any desired width and may be laid side by side in one direction until a sheet of required size is produced, and for thicker or stronger sheets a double thickness with fibers laid at right angles to the former is used, or I might build up the sheet from any number of strips or sheets, laying the fibers on the cross or in any suitable direction to produce the strength required.

I do not limit myself to any particular fiber or fibers whether selected either from the animal or vegetable kingdom, as I may employ rhea, ramie, flax, hemp, cotton or other fibers or camel or other suitable hair or wool according to varying practical requirements, but I preferably select such fibers as are capable of resisting the action of water or weak acids.

The sheeting produced in the above manner being absolutely waterproof and very thin and light is capable of being used for any purpose where waterproof sheeting is at present applicable, and appears to be entirely suitable for tarpaulins, military ground bed sheets, wings for flying machines, waterproof garments, hot water bottles, or for making up into any of the numerous articles for which rubber sheeting is usually employed. The fibrous rubber material produced by this invention is also suitable for the manufacture of hose pipe, tubing, pneumatic tire covers and other like articles.

I do not desire to limit the application of my invention to any particular purpose for which my improved fibrous rubber material may be employed, nor to any particular method of incorporating the fibers with the rubber-like substance.

Having now described my invention what I claim as new and desire to secure by Letters Patent is:—

1. A fabric composed of a sheet of unspun fibers approximately one fiber thick, impregnated and incorporated with a liquid adhesive so that the fibers are entirely surrounded by said adhesive.

2. A fabric composed of a plurality of superimposed strips, each of which is constructed from a sheet of unspun fibers approximately one fiber thick impregnated and incorporated with a liquid adhesive so as to be entirely surrounded by said adhesive.

3. Articles composed of fabric formed from a plurality of superimposed strips, each of which consists of a sheet of unspun fibers approximately one fiber thick impregnated and incorporated with a liquid adhesive so that the fibers are entirely surrounded by said adhesive.

In testimony whereof I have signed my name to this specification in the presence of two subscribing witnesses.

JAMES WALTER HENRY DEW.

Witnesses:
WILLIAM BARTON,
WM. O. BROWN.